United States Patent
Tamaki

(10) Patent No.: US 11,956,700 B2
(45) Date of Patent: Apr. 9, 2024

(54) WIRELESS COMMUNICATION SYSTEM AND WIRELESS COMMUNICATION APPARATUS

(71) Applicant: Hitachi Astemo, Ltd., Hitachinaka (JP)

(72) Inventor: Satoshi Tamaki, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 357 days.

(21) Appl. No.: 17/596,940

(22) PCT Filed: Jul. 29, 2020

(86) PCT No.: PCT/JP2020/029031
§ 371 (c)(1),
(2) Date: Dec. 22, 2021

(87) PCT Pub. No.: WO2021/039255
PCT Pub. Date: Mar. 4, 2021

(65) Prior Publication Data
US 2022/0272509 A1    Aug. 25, 2022

(30) Foreign Application Priority Data
Aug. 23, 2019  (JP) ................................. 2019-152813

(51) Int. Cl.
*H04W 4/46*   (2018.01)
*H04W 4/70*   (2018.01)
(Continued)

(52) U.S. Cl.
CPC ............... *H04W 4/46* (2018.02); *H04W 4/70* (2018.02); *H04W 72/0446* (2013.01); *H04W 72/0453* (2013.01); *H04W 72/53* (2023.01)

(58) Field of Classification Search
CPC ......... H04W 72/0453; H04W 72/0446; H04W 72/53; H04W 4/70; H04W 4/46
(Continued)

(56) References Cited

U.S. PATENT DOCUMENTS

| 11,641,644 B2* | 5/2023 | Badic .................... H04W 40/24 370/329 |
| 11,659,590 B2* | 5/2023 | Kang .................... H04W 52/34 370/329 |

(Continued)

FOREIGN PATENT DOCUMENTS

| JP | 8-163018 A | 6/1996 |
| JP | 2008-163018 A | 7/2006 |

(Continued)

OTHER PUBLICATIONS

International Search Report (PCT/ISA/210) issued in PCT Application No. PCT/JP2020/029031 dated Sep. 8, 2020 with English translation (four (4) pages).
(Continued)

*Primary Examiner* — Peter G Solinsky
(74) *Attorney, Agent, or Firm* — Crowell & Moring LLP

(57) ABSTRACT

The present invention provides a wireless communication system capable of performing communication between wireless communication apparatuses respectively mounted on vehicles performing platooning is characterized in that a frequency channel used in data transmission and reception between an own vehicle and a preceding vehicle adjacent to the own vehicle, and a frequency channel used in data transmission and reception between the own vehicle and a succeeding vehicle adjacent to the own vehicle are different from each other.

15 Claims, 6 Drawing Sheets

(51) Int. Cl.
*H04W 72/0446* (2023.01)
*H04W 72/0453* (2023.01)
*H04W 72/53* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,671,907 | B2* | 6/2023 | Kedalagudde | H04L 43/0841 |
| | | | | 370/329 |
| 11,706,721 | B2* | 7/2023 | Yi | H04W 52/383 |
| | | | | 370/329 |
| 11,889,395 | B2* | 1/2024 | Swar | H04W 52/0229 |
| 2008/0145436 | A1 | 6/2008 | Lorant | |
| 2018/0279096 | A1 | 9/2018 | Wu et al. | |
| 2020/0267573 | A1* | 8/2020 | Pfadler | H04W 4/44 |
| 2023/0292243 | A1* | 9/2023 | Mueck | H04W 52/0216 |

FOREIGN PATENT DOCUMENTS

| | | |
|---|---|---|
| JP | 2008-278045 A | 11/2008 |
| JP | 2011-250021 A | 12/2011 |
| JP | 2012-54799 A | 3/2012 |

OTHER PUBLICATIONS

Japanese-language Written Opinion (PCT/ISA/237) issued in PCT Application No. PCT/JP2020/029031 dated Sep. 8, 2020 with English translation (five (5) pages).

C4KT Corp., BWP operation on V2X sidelink, 3GPP TSG RAN WGl #95 RI-1813497, Nov. 2, 2018, <URL:http://www.3gpp.org/ftp/tsg_ran/WG1_RL1/TSGR1_95/Docs/RI-1813497.zip>, fig. 1 (five (5) pages).

Japanese-language Office Action issued in Japanese Application No. 2019-152813 dated Feb. 28, 2023 with English translation (10 pages).

* cited by examiner

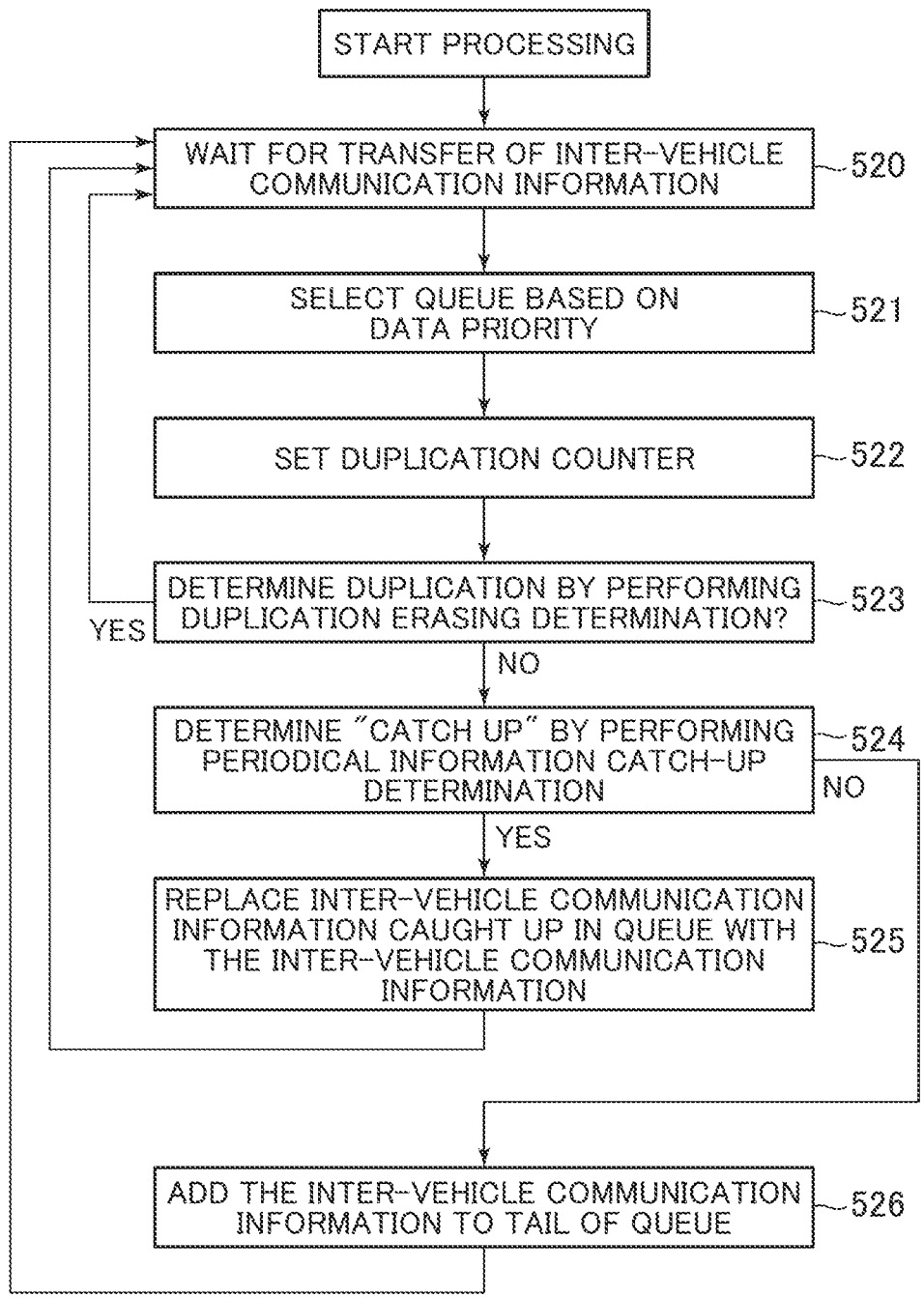

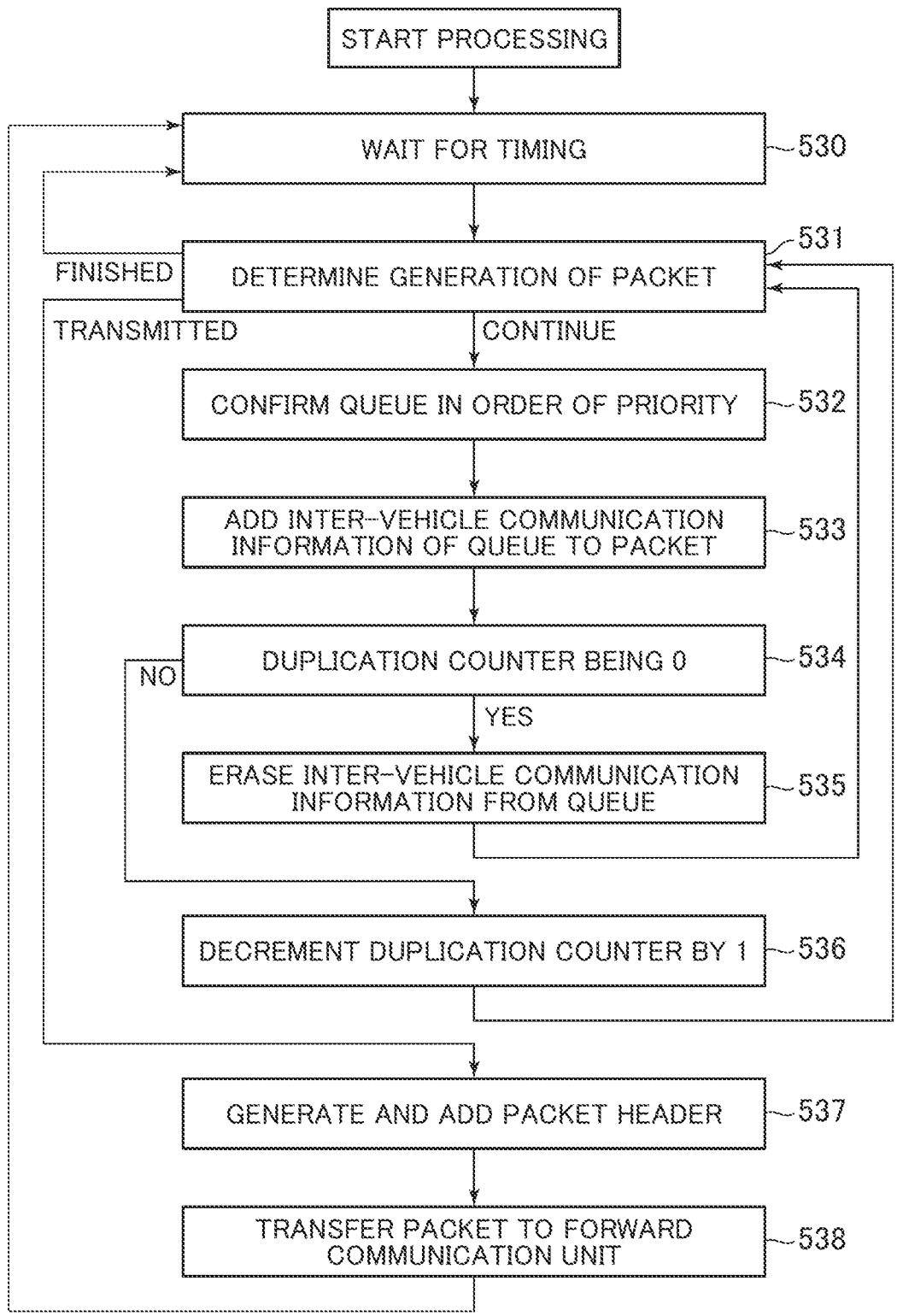

FIG. 8A

| BETWEEN VEHICLES | 1-2 | 2-3 | 3-4 | 4-5 | 5-6 |
|---|---|---|---|---|---|
| CHANNEL | A | B | C | A | B |

FIG. 8B

| BETWEEN VEHICLES | 1-2 | 2-3 | 3-4 | 4-5 | 5-6 |
|---|---|---|---|---|---|
| CHANNEL | A | B | C | A | B |
| POLARIZATION | HORIZONTAL | VERTICAL | HORIZONTAL | VERTICAL | HORIZONTAL |

FIG. 9A

| VEHICLE | 1 | 2 | 3 | 4 | 5 | 6 |
|---|---|---|---|---|---|---|
| FRONTWARD TRANSMISSION | – | 1 | 3 | 5 | 7 | 9 |
| BACKWARD TRANSMISSION | 0 | 2 | 4 | 6 | 8 | – |

FIG. 9B

| VEHICLE | 1 | 2 | 3 | 4 | 5 | 6 |
|---|---|---|---|---|---|---|
| FRONTWARD TRANSMISSION | – | 1 | 1 | 1 | 1 | 1 |
| BACKWARD TRANSMISSION | 0 | 0 | 0 | 0 | 0 | – |

FIG. 9C

| VEHICLE | 1 | 2 | 3 | 4 | 5 | 6 |
|---|---|---|---|---|---|---|
| FRONTWARD TRANSMISSION | – | 1 | 3 | 1 | 3 | 1 |
| BACKWARD TRANSMISSION | 0 | 2 | 0 | 2 | 0 | – |

WIRELESS COMMUNICATION SYSTEM AND WIRELESS COMMUNICATION APPARATUS

INCORPORATION BY REFERENCE

This patent application claims the benefit of priority to Japanese patent application No. 2019-152813 filed on Aug. 23, 2019 which is incorporated by reference herein in their entirety.

TECHNICAL FIELD

The present invention relates to a wireless communication system which realizes communication between vehicles performing platooning, and a wireless communication apparatus which constitutes the wireless communication system.

BACKGROUND ART

To realize platooning where a plurality of vehicles travel as a platoon in such a manner that a succeeding vehicle follows a preceding vehicle, the development and the application of an inter-vehicle communication technique where driving information is shared by the vehicles have been in progress. From a viewpoint of improvement of fuel mileage performance and enhancement of traffic efficiency, it is desirable that a distance between the vehicles in the platoon be as short as possible. To shorten the distance between the vehicles, it is necessary to make a delay in a control between the vehicles small. It is also desirable that a delay in inter-vehicle communication which share information be small. Further, it is desirable that such control and communication be performed with high accuracy.

When a number of vehicles which form a platoon is increased, an amount of communication in the platoon is increased and hence, wireless communication influence each other resulting in the increase in a delay in communication and lowering of the reliability of the control and the communication. In view of the above, with respect to the inter-vehicle communication which is applicable to the platooning, there have been proposed various techniques for enhancing the reliability.

For example, JP-A No. 2011-250021 discloses a technique which is developed aiming at the suppression of interruption of communication as much as possible by reducing an amount of communication necessary for confirmation of transmission, in a platooning traveling system which performs platooning by making use of bidirectional communication.

SUMMARY OF INVENTION

Technical Problem

For example, the technique disclosed in JP-A No. 2011-250021 is provided on the premise that all vehicles in a platoon can receive a wireless signal which a specific vehicle transmits or the specific vehicle can receive wireless signals which all vehicles in the platoon transmit. Accordingly, a wide electric wave arrival range in wireless communication which covers at least a half the length of the platoon becomes necessary. Further, since the electric wave arrival range of wireless communication is wide, a possibility that inter-vehicle communication in the platoon influences wireless communication outside the platoon is increased. As an opposite case, a possibility that wireless communication outside the platoon influences the inter-vehicle communication in the platoon so that the reliability of communication is lowered is increased. Further, the larger the number of vehicles in the platoon, the larger the number of required simultaneous connections becomes and hence, a possibility that the increase of delays and lowering of reliability caused by collisions between inter-vehicle communications in the platoon or the like occur is increased.

The present invention has been made to overcome the above-mentioned drawbacks, and it is an object of the present invention to provide a wireless communication system which, in performing communication between vehicles travelling in a platoon, suppresses increase of delays and lowering of reliability caused by a collision between inter-vehicle communications in the platoon or the like without requiring a wide electric wave arrival range of wireless communication.

Solution to Problem

According to one aspect of the present invention, there is disclosed a wireless communication system which performs communication between wireless communication apparatuses mounted on vehicles which perform platooning, a frequency channel used in data transmission and reception between an own vehicle and a preceding vehicle adjacent to the own vehicle and a frequency channel used in data transmission and reception between the own vehicle and a succeeding vehicle adjacent to the own vehicle are different from each other.

Advantageous Effects of Invention

According to one aspect of the present invention, it is possible to provide a wireless communication system and a wireless communication apparatus which exhibits low possibility of occurrence of a delay and high reliability with respect to inter-vehicle communication in platooning.

BRIEF DESCRIPTION OF DRAWINGS

FIG. 6 is a flowchart of one example of transmission buffer processing according to the embodiment of the present invention.

FIG. 7 is a flowchart of one example of frontward transmission processing according to the embodiment of the present invention.

FIGS. 8A and 8B are views showing one example of a table showing the selection of a channel according to the embodiment of the present invention.

FIGS. 9A-9C are views showing an example of transmission timing designation according to the embodiment of the present invention.

DESCRIPTION OF EMBODIMENT

Hereinafter, an embodiment of the present invention is described with reference to drawings.

Figure 1:
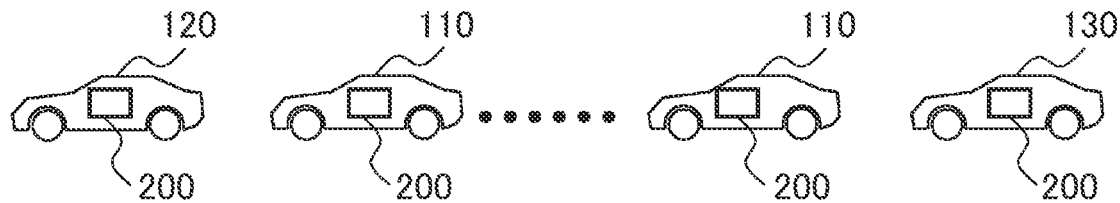
FIG. 1 is a schematic view of a group of vehicles in platooning to which a wireless communication system according to an embodiment of the present invention is applicable.

FIG. 1 is a schematic view of a group of vehicles in platooning to which a wireless communication system according to the embodiment of the present invention is applicable. The group of vehicles in platooning is formed of a plurality of vehicles. The group of vehicles includes one head vehicle 120 and one tail vehicle 130 and further includes no intermediate vehicle or includes one or more intermediate vehicles. Hereinafter, with respect to the above-mentioned vehicles, a vehicle which is adjacent to an own vehicle and travels immediately in front of the own vehicle in the platoon is referred to as "immediately preceding vehicle", and a vehicle which is adjacent to the own vehicle and travels immediately behind the own vehicle in the platoon is referred to as "immediately succeeding vehicle".

Each of the respective vehicles has an inter-vehicle communication unit 200 which notifies information on the own vehicle to other vehicles via wireless communication, and receives information on other vehicles via the wireless communication. An inter-vehicle communication system employed by the inter-vehicle communication unit 200 may be, for example, a wireless local area network (LAN), a wireless personal area network (PAN), a dedicated short range communication (DSRC), a long-term evolution-vehicle to everything (LTE-V2X) based on cellular communication, or any other systems.

Figure 2:
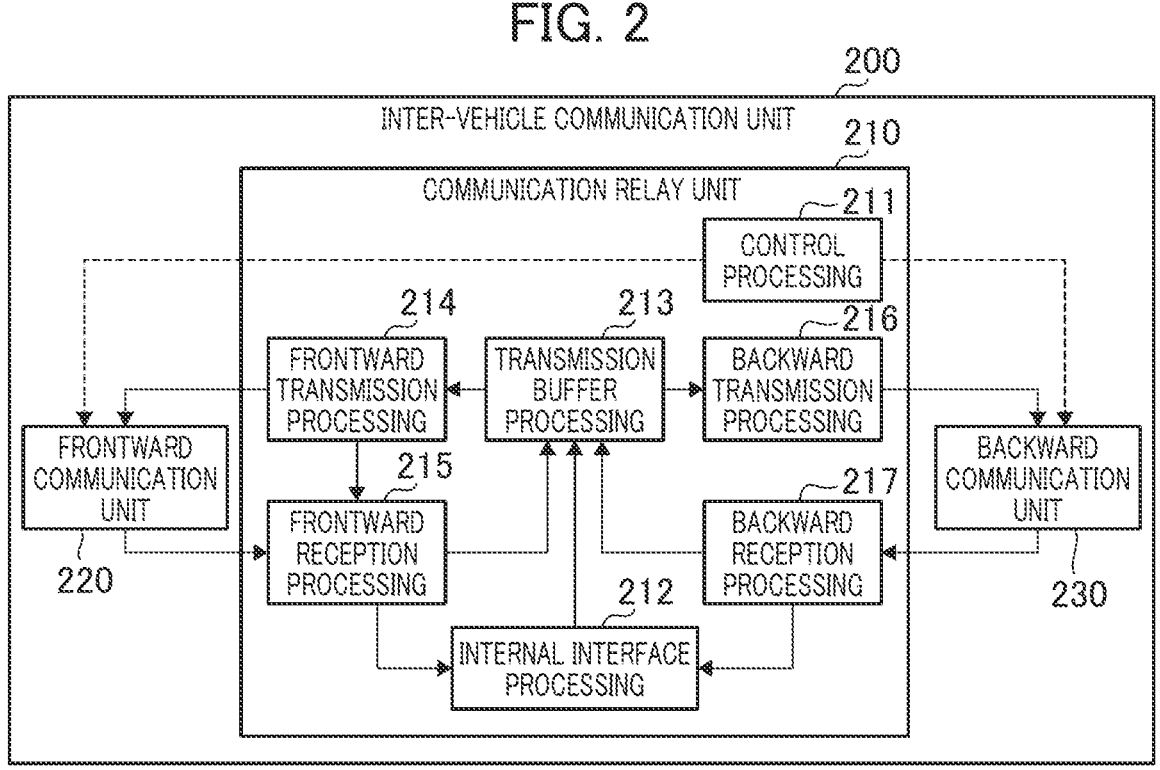
FIG. 2 is a schematic view of an inter-vehicle communication unit according to the embodiment of the present invention.

FIG. 2 is a schematic view of the inter-vehicle communication unit 200 according to the embodiment of the present invention. The inter-vehicle communication unit 200 includes a communication relay unit 210, a frontward communication unit 220, and a backward communication unit 230.

The communication relay unit 210 includes processing consisting of control processing 211, internal interface processing 212, transmission buffer processing 213, frontward transmission processing 214, frontward reception processing 215, backward transmission processing 216, and backward reception processing 217.

The control processing 211 controls the entire processing by performing respective processing in the communication relay unit 210, and setting of parameters, setting of operation timings and the like with respect to the frontward communication unit 220 and the backward communication unit 230.

The internal interface processing 212 is connected to a control network in a vehicle such as a controller area network (CAN) and an information network in the vehicle such as an in-vehicle local area network (LAN), for example. The internal interface processing 212 extracts information necessary for performing inter-vehicle communication, processes the information into an information format suitable for inter-vehicle communication, and transfers the processed information to the transmission buffer processing 213. Further, the internal interface processing 212 processes information addressed to an own vehicle which is transferred from the frontward reception processing 215 or the backward reception processing 217, and transfers the processed information to the control network and the information network in the vehicle.

The transmission buffer processing 213 stores information which is transferred from the internal interface processing 212, the frontward reception processing 215, or the backward reception processing 217, and is to be transmitted via inter-vehicle communication. Further, the transmission buffer processing 213 transfers stored information for performing inter-vehicle communication in response to a request from the frontward transmission processing 214 or the backward transmission processing 216. Still further, the transmission buffer processing 213 performs duplication and erasing of stored information for performing inter-vehicle communication in accordance with an instruction from the control processing 211.

The frontward transmission processing 214 acquires information for performing inter-vehicle communication from the transmission buffer processing 213 in accordance with an instruction from the control processing 211, and generates inter-vehicle communication packets based on information used in performing one or a plurality of inter-vehicle communications, and transfers the inter-vehicle communication packets to the frontward communication unit 220.

The frontward reception processing 215 waits for the transfer of inter-vehicle communication packets from the frontward communication unit 220, and transfers respective information for performing inter-vehicle communication in the transferred inter-vehicle communication packets to at least one of the internal interface processing 212 and the transmission buffer processing 213 corresponding to addressed vehicles.

The backward transmission processing 216 acquires information for performing inter-vehicle communication from the transmission buffer processing 213 in accordance with an instruction from the control processing 211, and generates inter-vehicle communication packets based on information used in performing one or a plurality of inter-vehicle communications, and transfers the inter-vehicle communication packets to the backward communication unit 230.

The backward reception processing 217 waits for the transfer of the inter-vehicle communication packets from the backward communication unit 230, and transfers respective information for performing inter-vehicle communication in the transferred inter-vehicle communication packets to at least one of the internal interface processing 212 and the transmission buffer processing 213 corresponding to addressed vehicles.

The frontward communication unit 220 is a unit which performs wireless communication with a preceding vehicle. The frontward communication unit 220 establishes the wireless communication connection with the backward communication unit 230 of an immediately preceding vehicle, receives a wireless signal which the backward communication unit 230 of the immediately preceding vehicle transmits and transfers the received wireless signal to the communication relay unit 210, and transmits information transferred from the communication relay unit 210 to the backward communication unit 230 of the immediately preceding vehicle in the form of a wireless signal.

The backward communication unit 230 is a unit which performs wireless communication with a succeeding vehicle. The backward communication unit 230 establishes the wireless communication connection with the frontward communication unit 220 of an immediately succeeding vehicle, receives a wireless signal which the frontward communication unit 220 of the immediately succeeding vehicle transmits and transfers the received wireless signal to the communication relay unit 210, and transmits information transferred from the communication relay unit 210 to the frontward communication unit 220 of the immediately succeeding vehicle in the form of a wireless signal.

The communication relay unit 210, the frontward communication unit 220 and the backward communication unit 230 of the inter-vehicle communication unit 200 may each be formed of individual hardware. Alternatively, the communication relay unit 210, the frontward communication unit 220 and the backward communication unit 230 of the inter-vehicle communication unit 200 may be formed by collectively mounting a plurality of parts on a single hardware. Further, for example, a signal processing function of the frontward communication unit 220 and a signal processing function of the backward communication unit 230 may be performed by the same hardware, or the signal processing function of the frontward communication unit 220 and the signal processing function of the backward communication unit 230 may be performed by using the same hardware in common partially and the frontward communication unit 220 and the backward communication unit 230 have different or independent antennas from each other.

The inter-vehicle communion unit 200 of the head vehicle 120 may not have a function relating to communication with an immediately preceding vehicle such as the function of the frontward communication unit 220 or the like, or may stop an operation provided that the head vehicle 120 has substantially the same function as the intermediate vehicle 110 or the tail vehicle 130. In the same manner, the inter-vehicle communication unit 200 of the tail vehicle 130 may not have a function relating to communication with the immediately succeeding vehicle such as the function of the backward communication unit 230 or the like, or may stop the operation provided that the inter-vehicle communication unit 200 of the tail vehicle 130 has substantially the same function as the intermediate vehicle 110 or the head vehicle 120.

Further, the frontward communication unit 220 and the backward communication unit 230 may be determined based on which communication unit is on a side where the transmission of an electric wave starts first at the time of starting the connection. That is, for example, a wireless LAN is used as a wireless communication system, the frontward communication unit 220 may be operated as an access point, the backward communication unit 230 may be operated as a terminal, or the reverse combination may be adopted.

Figure 3:
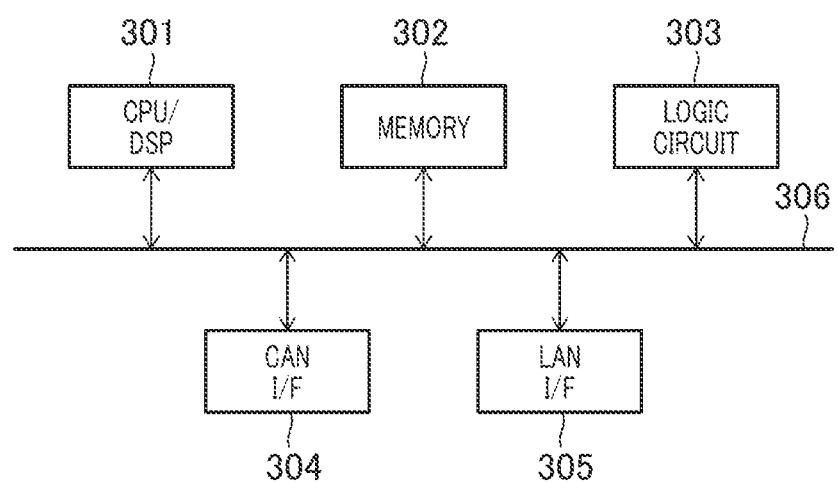
FIG. 3 is a schematic view of a hardware configuration of a communication relay unit according to the embodiment of the present invention.

FIG. 3 is a schematic view of the hardware configuration of the communication relay unit 210 according to the embodiment of the present invention. The communication relay unit 210 is formed of, for example, a CPU/DSP part 301, a memory part 302, a logic circuit part 303, a CAN I/F part 304, a LAN I/F part 305, and a bus 306 which connects these respective parts. Respective processing of the communication relay unit 210 are, for example, programs stored in the memory part 302, and are operated using resources of the CPU/DSP part 301, the memory part 302, and the logic circuit part 303. It is desirable that the respective processing of the communication relay unit 210 be respectively independently operated or as processes or threads which differ for every several processing. The internal interface processing 212 is connected to a control network in the vehicle via the CAN I/F part 304, or is connected to the information network in the vehicle via the LAN I/F part 305. The frontward transmission processing 214 and the frontward reception processing 215 are connected to the frontward communication unit 220 via the LAN I/F part 305. The backward transmission processing 216 and the backward reception processing 217 are connected to the backward communication unit 230 via the LAN I/F part 305.

Figure 4:
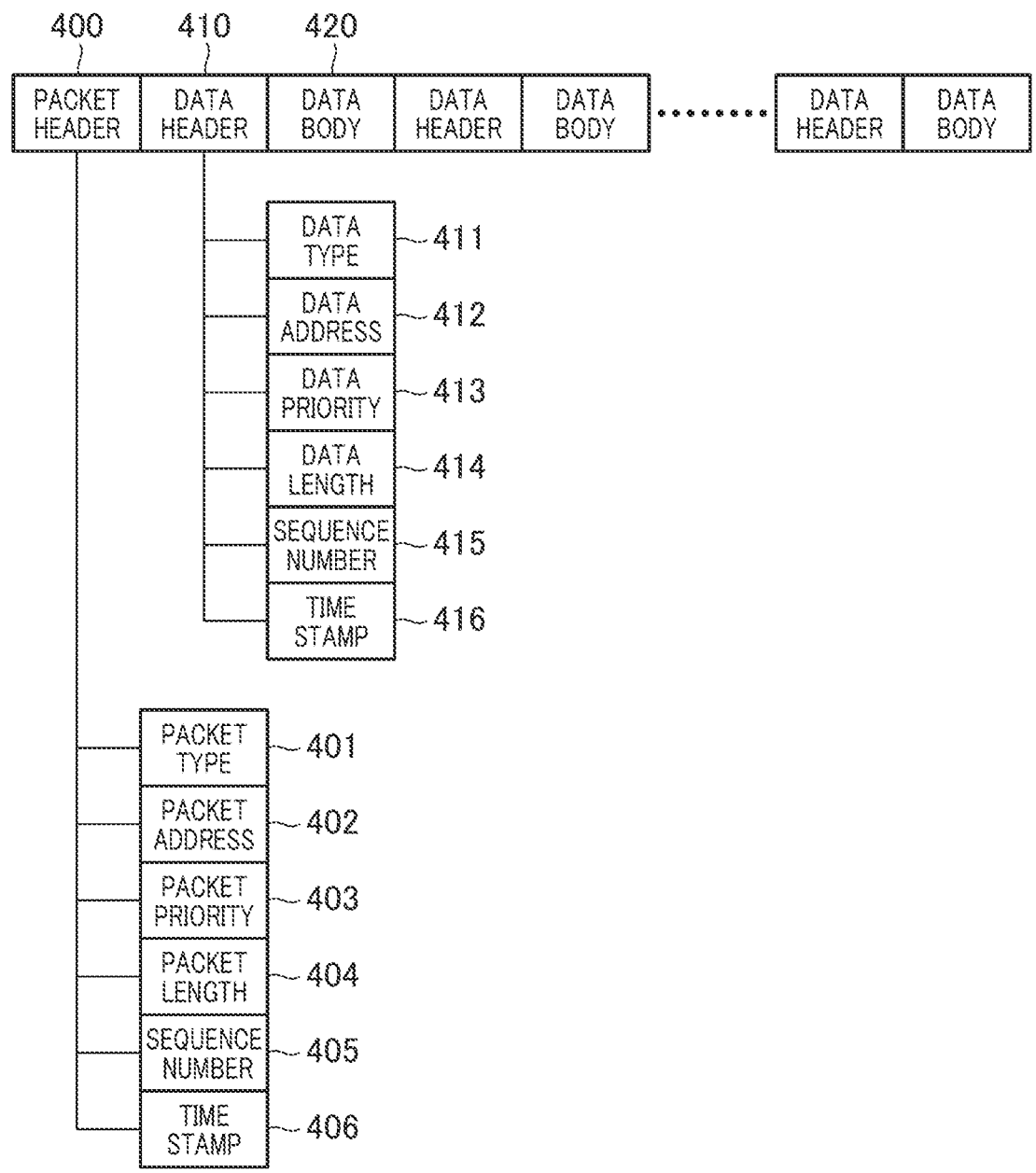
FIG. 4 is a view showing one example of a configuration of an inter-vehicle communication packet according to the embodiment of the present invention.

FIG. 4 is a view showing one example of the configuration of an inter-vehicle communication packet according to the embodiment of the present invention. The inter-vehicle communication packet is formed of inter-vehicle communication information which includes a packet header 400 and one or a plurality of combinations each consisting of a data header 410 and a data body 420. The data header 410 and the data body 420 are generated in the internal interface processing 212, and the packet header 400 is generated in the frontward transmission processing 214 or the backward transmission processing 216.

The data body 420 is, for example, information generated by processing in the internal interface processing 212 based on information of the inside of the vehicle. The data header 410 is a group of information generated for expressing characteristics, a state and the like of the data body 420 at the time of generating the data body 420, and includes at least one of a data type 411, a data address 412, data priority 413, a data length 414, a data sequence number 415, and a data time stamp 416. The data type 411 is a symbol indicating the content of information included in the data body 420. For example, the symbol indicates that the content of the data body 420 is a moving speed of the vehicle or the content of the data body 420 is coordinates of the vehicle. The data address 412 is a symbol which indicates a vehicle to which the data body 420 is transmitted, and the data address 412 is formed of an addressed vehicle number and a broadcast flag. When the broadcast flag is set to Off, the data is transmitted such that only the vehicle indicated by the addressed vehicle number can receive the data. When the broadcast flag is set to On, the data is transmitted such that all vehicles on a path including the vehicle indicated by the addressed vehicle number can receive the data. For example, by allowing the head vehicle 120 to designate the tail vehicle 130 as the addressed vehicle number and by setting the broadcast flag to On, the data is transmitted to all vehicles. The data priority 413 is a symbol indicating emergency property of the data, and the data priority 413 is adjusted such that the higher the priority, the smaller a delay becomes. The data length 414 is, for example, a length of the data body 420 per byte, or a sum of a length of the data header 410 and the length of the data body 420. The data sequence number 415 is the number of the data for every data type 411, the data sequence number 415 is a number which is selected such that the more later the data is generated, the larger the number becomes. For example, when 8 bits are prepared for holding the data sequence number 415 and the number is incremented by one each time the data is generated, with respect to the data sequence number, 1 comes next to 0, 2 comes next to 1, . . . , and 0 comes next to 255 again. The data time stamp 416 is a symbol indicating information on a point of time at which the data body 420 is generated.

The packet header 400 includes at least one of a packet type 401, a packet address 402, packet priority 403, a packet length 404, a packet sequence number 405, and a packet time stamp 406. The packet type 401 is a symbol indicating information which the packet includes, the packet address 402 is a symbol indicating a vehicle which receives the packet. Usually, the packet address 402 indicates an immediately preceding vehicle when the packet is generated in the frontward transmission processing 214, and indicates an immediately succeeding vehicle when the packet is generated in the backward transmission processing 216. The packet priority 403 is priority of the packet set in the forward communication unit 220 or the backward communication unit 230. The packet length 404 is at least one of a length of the inter-vehicle communication packet per byte and information on the number of set of combinations each consisting of the data header 410 and the data body 420 in the inter-vehicle communication packet. The data sequence number 415 is a number of data for every packet type 401. The data sequence number 415 is a number selected such that the more later the data is generated, the larger the data sequence number 415 becomes. After the data sequence number 415 becomes a maximum value within a bit range where the data sequence number 415 is held, the data sequence number 415 is repeated from the minimum value. The data time stamp 416 is a symbol indicating information of a point of time at which the packet is generated.

Figure 5:
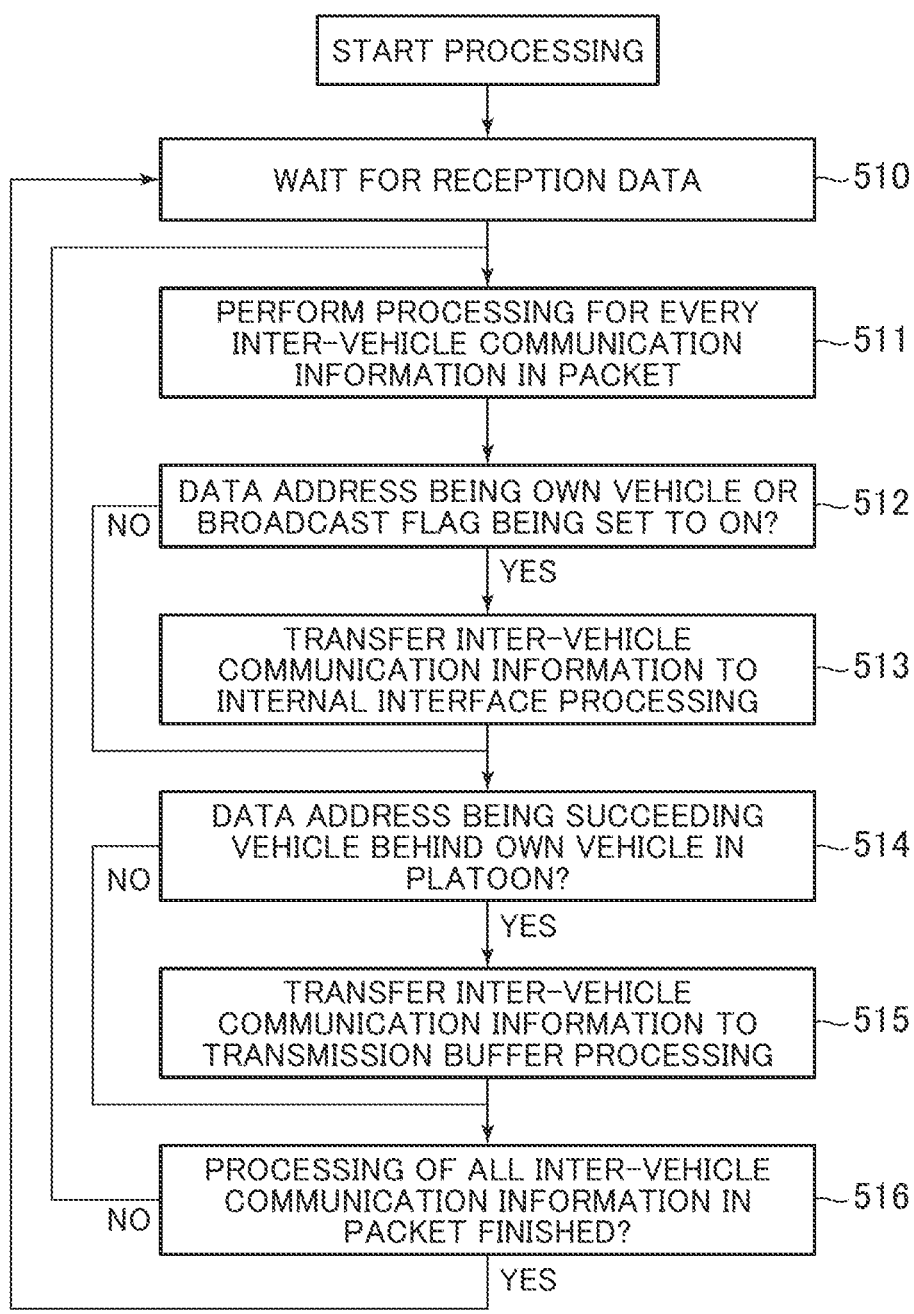
FIG. 5 is a flowchart of one example of frontward reception processing according to the embodiment of the present invention.

FIG. 5 is a flowchart of one example of the frontward reception processing 215 according to the embodiment of the present invention. In the frontward reception processing 215, first, the frontward reception processing 215 waits for the transfer of the inter-vehicle communication packet received from the frontward communication unit 220 in the processing 510, and processing advances to the next processing 511 when the inter-vehicle communication packet arrives. When a plurality of inter-vehicle communication packets are simultaneously transferred, processing which include the processing 511 and the succeeding processing are sequentially performed with respect to each inter-vehicle communication packet.

In the processing 511, the inter-vehicle communication packet is separated, and the processing which includes processing 512 and the succeeding processing are performed for every inter-vehicle communication information included in the separated inter-vehicle communication packet. In the processing 512, the data address 412 included in the data header 410 of the inter-vehicle communication information is confirmed. When an own vehicle has been designated in the data address 412 or a broadcast flag has been set in the data address 412, the processing is branched to processing 513, and is branched to processing 514 in other cases. In the processing 513, the inter-vehicle communication information is transferred to the internal interface processing 212. In the processing 514, the data address 412 included in the data header 410 of the inter-vehicle communication information is confirmed. When the vehicle designated in the data address 412 is a vehicle behind the own vehicle in a platoon, the processing is branched to the processing 515, and the processing is branched to the processing 516 in other cases. In the processing 515, the inter-vehicle communication information is transferred to the transmission buffer processing 213. In the processing 516, it is confirmed whether or not the processing with respect to all inter-vehicle communication information in the packet are completed. When the processing are completed, the processing is branched to the processing 510, and the processing is branched to the processing 511 in other cases.

The processing in the backward reception processing 217 is equal to the frontward reception processing 215 except for a point that, in the processing 514, it is confirmed that a data addressed vehicle is a vehicle in front of an own vehicle in a platoon instead of confirming that the data addressed vehicle is a vehicle behind the own vehicle in the platoon.

FIG. 6 is a flowchart of one example of the transmission buffer processing 213 according to the embodiment of the present invention. In the transmission buffer processing 213, first, in processing 520, the processing 213 waits for the transfer of inter-vehicle communication information from the internal interface processing 212, the frontward reception processing 215 or the backward reception processing 217, and the processing advances to next processing 521 when the inter-vehicle communication information arrives. When a plurality of inter-vehicle communication information are simultaneously transferred, processing which include processing 521 and the succeeding processing are sequentially performed with respect to each inter-vehicle communication information. Further, in the transmission buffer processing 213, the processing waits for a transmission queue area formed of one or a plurality of queues associated with data priority and a transmission direction. For example, when three data priorities are set with respect to the intermediate vehicle 110, three priorities are set with respect to a frontward direction and three priorities are set with respect to a backward direction. That is, the transmission buffer processing 213 has six queues in total. In this embodiment, for the sake of convenience, the term "queue" is used. However, a data format is not necessarily a queue. For example, the data format may be a transmission queue area implemented by the combination of an array, an associative array, a structural body and the like.

In the processing 521, a queue associated with the inter-vehicle communication information is selected based on the data priority 413 and the data address 412 in the data header 410. The succeeding processing are performed using the queue selected in this manner. Next, in processing 522, setting of a duplication counter is performed. Setting of the duplication counter is performed by the control processing 211 based on information set for respective data types 411 in such a manner that the duplication counter is set to 0 with respect to inter-vehicle communication information which is not duplicated, and the duplication counter is set to a plural number of times with respect to inter-vehicle communication information which is duplicated. For example, the duplication number is set to 1 with respect to information which is transmitted twice by duplication, and is set to 2 with respect to information which is transmitted three times. In this manner, a value decremented from the number of times of transmission by 1 is set as the duplication number. Next, in processing 523, duplication erasing processing is performed based on whether or not duplication erasing processing can be performed set by the control processing 211. In the duplication erasing processing, the data headers 410 of all inter-vehicle communication information in the queue and the data header 41 of the inter-vehicle communication information which is under processing are compared to each other. When there exists the inter-vehicle communication information where the whole or a part of information of the data header 410 (for example, the data type 411 and the data sequence number 415, or the data type 411 and the data time stamp 416 or the like) are equal, the duplication is determined. When it is determined that the inter-vehicle communication information duplicate, processing relating to the inter-vehicle communication information is finished, and the processing returns to processing 520. Accordingly, by suppressing the information duplicated by being transmitted a plural times by setting the duplication counter or the like, for example, it is possible to avoid the duplication of information having the same contents. In a case where it is set that duplication erasing processing is not performed by the control processing 211, or in a case where the performing of duplication erasing processing is defined based on the data type 411 and the data type 411 of the inter-vehicle communication information is set so as not to perform the duplicate erasing processing, the duplication is not determined, and processing which corresponds to a case where the duplication is not determined is constantly performed.

When it is not determined that inter-vehicle communication information duplicate, next, in processing 524, periodical information catch-up determination is performed based on whether or not periodical information catch-up processing set in the control processing 211 can be performed. In the periodic information catch-up determination, the data headers 410 of all inter-vehicle communication information in a queue and the data header 410 of the inter-vehicle communication information which is under processing currently are compared with each other. In a case where the inter-vehicle communication information exists in which, for example, the data types 411 agree and the data sequence number 415 or the data time stamps 416 do not agree in the data headers 410, it is determined that a catch-up of the inter-vehicle communication information is generated. When it is determined that the catch-up of the inter-vehicle communication information is generated, in processing 525, it is determined that the inter-vehicle communication information on a side existing in the queue is caught-up by a new inter-vehicle communication information, the caught-up inter-vehicle communication information is erased from the queue, and the inter-vehicle communication information on a catch-up side is newly added to the queue. The location at which the inter-vehicle communication information on the catch-up side is inserted into the queue may be a tail of the queue or may be the location where the inter-vehicle communication information on the side where the caught-up inter-vehicle communication information exists. By performing such processing, for example, in a case where a situation arises where the arrival of vehicle information and the like periodically transmitted for every fixed time interval is delayed due to congestion of communication zones, the congestion can be eliminated by suppressing the transmission of old information which already becomes unnecessary. When time stamps do not agree with each other, data of the preceding time stamp may be erased, or data of the succeeding time stamp may be erased. Further, in a case where it is set that the periodic information catch-up determination is not performed by the control processing 211, or in a case where the performing of the periodic information catch-up determination is defined in accordance with the data type 411 and it is set that the data type 411 of the inter-vehicle communication information does not perform the periodic information catch-up determination, the periodic information catch-up determination is not performed, and processing which corresponds to the case that the catch-up determination is not performed is constantly performed. In a case where it is not determined that the catch-up is generated, in processing 526, the inter-vehicle communication information is added to a tail of queue, and the processing relating to the inter-vehicle communication information is finished and the processing returns to the processing 520.

FIG. 7 is a flowchart of one example of the frontward transmission processing according to the embodiment of the present invention. In the frontward transmission processing 214, first, in processing 530, the processing 214 waits for transmission timing designated by the control processing 211, and the processing advances to processing 531 at a point of time that it is determined that transmission timing arrives. In the processing 531, the generation of a packet is determined. In a case where inter-vehicle communication information does not exist in any queue at a point of time that the processing arrives at the processing 531 from the processing 530, the processing is finished, and the processing advances to the processing 530 again. In a case where inter-vehicle communication information exists in any one of queues, the processing including processing 532 and the succeeding processing are performed sequentially from a head of the queue having high priority for generating a packet. In the frontward transmission processing 214, only the queue associated with the frontward transmission is treated. Accordingly, all queues in this frontward transmission processing indicate all queues associated with the frontward transmission. In the case where the processing including the processing 532 and the succeeding processing are performed and the inter-vehicle communication information exists in the generated packet, the processing advances to processing 537 for transmission of the packet if any one of the following conditions is satisfied.

Condition 1. All queues are empty or only information equal to the inter-vehicle communication information on the packet exists in any queue.

Condition 2. With respect to a maximum packet length designated by the control processing 211, a length of the packet which is being generated has no margin for adding new inter-vehicle communication information.

Condition 3. In a case where the control processing 211 designates that mixed loading of data priorities is not allowable, the queue having the same priority as the inter-vehicle communication information already added to the packet is empty or only information equal to the inter-vehicle communication information already added to the packet exists.

When none of the above-mentioned conditions is satisfied, the processing advances to the processing 532 for the continuation of the generation of the packet.

In the processing 532, for the purpose of performing processing succeeding to the processing 532, the queues are selected in order starting from the queue which is associated with the inter-vehicle communication information having high priority and is not empty. In the processing 533, the frontmost inter-vehicle communication information excluding the inter-vehicle communication information already added to the packet in the queue selected in the processing 532 is added to the packet. Next, in processing 534, a duplication counter of the inter-vehicle communication information is confirmed. When the duplication counter is 0, in processing 535, the inter-vehicle communication information is erased from the queue, and the processing returns to the processing 531. In a case where the duplication counter is a value other than 0 as the result of confirmation in the processing 534, a value of the duplication counter is decremented by 1 in processing 536, and the processing returns to the processing 531.

In the processing 537, the packet header 400 is added to the packet to which one or a plurality of inter-vehicle communication information are added. Next, in processing 538, the generated packet is transferred to the forward communication unit 220, and the processing returns to the processing 530. In accordance with the processing described above, among a signal which an own vehicle generates and signals which other vehicles generate, the signals are transmitted sequentially from the signal having high priority.

The processing of the backward transmission processing 216 is equal to the processing of the frontward transmission processing 214 except for a point that a queue associated with the backward transmission is treated in place of the queue associated with the frontward transmission.

FIG. 8A is a view showing one example of a table showing the selection of a channel according to the embodiment of the present invention. In the embodiment of the present invention, channels are selected such that the channel which the frontward communication unit 220 of each vehicle uses and the channel which the backward communication unit 230 of each vehicle uses become different from each other so as to reduce influences which the frontward communication and the backward communication mutually exert on each other. The table shown in FIG. 8A illustrates an example where the channels which are available in a platoon of six vehicles are three channels, that is, the channels A, B and C. The number of vehicles in the platoon and the number of available channels are illustrated only for an exemplifying purpose, and substantially the same way is adopted in selecting channels also in cases where the number of the vehicles in the platoon and the number of available channels take different values from the values in the table shown in FIG. 8A.

In the case of the example shown in FIG. 8A, the backward communication unit 230 of the first head vehicle 120 and the frontward communication unit 220 of the second vehicle use the channel A, and the backward communication unit 230 of the second vehicle and the frontward communication unit 220 of the third vehicle use the channel B. To enable such selection of the channels, for example, each of the control processing 211 of all vehicles has the table shown in FIG. 8A in advance, the channel is selected based on the table corresponding to the location of the own vehicle in the platoon, and the control processing 211 sets the selected channel to the frontward communication unit 220 and the backward communication unit 230. Alternatively, instead of the table itself, the control processing 211 of all vehicles have functions which can derive the correspondence relationship shown in FIG. 8A in advance, the channels are calculated corresponding to the position of the own vehicle in the platoon, and the calculated channels are set in the frontward communication unit 220 and the rearward communication unit 230 from the control processing 211. Alternatively, the control processing 211 of all vehicles each have a list of candidate channels such as A, B and C, for example, in advance. First, the control processing 211 selects any channel among the candidate channels and establishes communication between the head vehicle 120 and the second vehicle. Next, the control processing 211 selects any non-use channel among the candidate channels and establishes the communication between the second vehicle and the third vehicle. Alternatively, for example, in the case where the channels are selected sequentially from the head vehicle 120 by the method described above, the channels may be selected in accordance with the regulation that, as the channels which the backward communication unit 230 of each intermediate vehicle 110 uses, any channels may be used provided that these channels differ from the channels which the frontward communication unit 220 uses. As another method, the channels may be selected such that a distance between the vehicles which use the same channel becomes as long as possible from each other by notifying the vehicles on a backward side of the channels selected between the respective vehicles while sequentially filling the channels in the table shown in FIG. 8A. In the above-mentioned processing, the channels are decided backward sequentially from the head vehicle 120. However, the channels may be decided frontward sequentially from the tail vehicle 130.

FIG. 8B is a view showing another one example of the table showing the selection of the channels according to the embodiment of the present invention. In this example, by allowing the frontward communication unit 220 and the backward communication unit 230 of each vehicle to use different planes of polarization in addition to the channels, influences are reduced which the frontward communication and the backward communication mutually exert on each other.

In this embodiment, "channels" are different frequency ranges like channels of a wireless LAN, for example, and are units by which communication can be independently performed originally. Alternatively, in a system which performs frequency hopping, for example, "channel" may not be a simple frequency unit, and may indicate a combination of a predetermined time and a frequency range. Alternatively, in a system which adopts code-division multiple access, for example, "channel" is a unit by which a spread processing is performed using a common code. Further, for example, in a case where a vehicle leaves from a platoon or in a case where the vehicle joins the platoon, channels between all vehicles may be decided again by resetting or, for example, only channels behind a location where a change of a platoon takes place may be changed while not changing channels within a range which are not influenced by leaving or joining of the vehicle. Information on a plurality of frequency channel candidates used in data transmission and reception may also be recorded in the tables shown in FIG. 8A and FIG. 8B.

FIG. 9 is a view showing an example of transmission timing designation according to the embodiment of the present invention. In accordance with a value designated as transmission timing, transmission instruction is transmitted to the frontward transmission processing 214 and the rearward transmission processing 216 from the control processing 211. Even when a channel which the frontward communication uses and a channel which the backward communication uses differ from each other, as shown in FIG. 8, electricity is partially leaked to the outside of channel in a usual wireless signal and hence, the frontward communication and the backward communication may completely influence each other so that interference between the channels may occur. To reduce this influence, transmission timing is adjusted in accordance with instructions shown in FIG. 9 so that the effects which the respective communications receive from communication outside the channels is reduced. Hereinafter, the description will be made in a case of a platoon formed of 6 vehicles in the same manner as the description of the platoon formed of 6 vehicles in the same manner as the description of FIG. 8. However, the adjustment of transmission timing is also applicable to a case where the number of vehicles differs from 6 in the same manner.

In the example shown in FIG. 9A, the platoon is formed of 6 vehicles and hence, 5 inter-vehicle spaces exist. The communication from a front side to a back side and the communication from the back side to the front side exist in each space between the respective vehicles and hence, 10 timing offsets are prepared. For example, a transmission opportunity in each vehicle is set to one time in 2 ms, and 10 timing offsets are set at an interval of 0.2 ms. In this case, for example, the value of the frontward transmission processing 214 of the second vehicle is set to 1 in the table, transmission times such as a transmission time after a lapse of 0.2 ms (=1×0.2 ms) from a reference time, a transmission time after a lapse of 2.2 ms (=2 ms+1×0.2 ms), a transmission time after a lapse of 4.2 ms (=4 ms+1×0.2 ms) are designated from the control processing 211, and generation of a packet and the transfer of the packet to the forward communication unit 220 are performed at the timings.

In FIG. 9A, all different timing offsets are used. However, the larger the number of vehicles in a platoon, the finer the timing offsets become, or it is necessary to extend transmission opportunities (that is, it is necessary to extend an interval between timings at which data transmission can be performed) and hence, the application of timing offsets becomes difficult. In view of the above, a method is considered where a common timing offset is repeatedly used in some transmission locations.

FIG. 9B shows another example of the designation of the timing offsets of the respective transmission locations. The frontward transmission processing 214 uses a timing offset 1 in common in all vehicles, and the backward transmission processing 216 uses a timing offset 0 in common in all vehicles. For example, assuming that the transmission opportunity is set to every 1 ms and two types of timing offsets are set at an interval of 0.5 ms, the frontward transmission processing 214 of each vehicle is set to transmission times such as a transmission time after a lapse of 0.5 ms (=1×0.5 ms), a transmission time after a lapse of 1.5 ms (=1 ms+1×0.5 ms), and a transmission time after a lapse of 2.5 ms (=2 ms+1×0.5 ms) from a reference time, and the frontward transmission processing 214 is performed.

FIG. 9C shows another example of the designation of timing offsets at respective locations. Transmission timings are set using 4 which is the lowest number of timing offsets where all timing offsets relating to signals which one vehicle transmits and receives are different from each other.

By controlling the frontward transmission processing 214 and the backward transmission processing 216 using the designation of these timing offsets, it is possible to reduce a possibility that the inter-vehicle communications influence each other by the interference between the channels and hence, the reliability of communication can be enhanced.

In the description of the examples described above, the calculation is performed by directly using the values shown in FIG. 9 as values of the timing offsets. However, in a case where the values in the table and the values of the actual timing offsets have the relationship of one-to-one correspondence, it is not always necessary to use such values as it is.

It is desirable that a large deviation does not exist between the reference time of the respective vehicles for setting the above-mentioned transmission timings. To prevent the occurrence of such a deviation, the respective vehicles may acquire common time information from an external system such as a global navigation satellite system (GNSS), for example, or time information of the respective vehicles may be synchronized by adopting a method such as network time protocol (NTP) using communication information during the continuation of the inter-vehicle communication in a platoon.

Further, in setting the above-mentioned transmission timing, for example, the control processing 211 of all vehicles has the table shown in FIG. 9 in advance, and the transmission timing is selected based on the table corresponding to the location of the own vehicle in the platoon, and the control processing 211 sets the transmission timing to the frontward transmission processing 214 and the backward transmission processing 216. Alternatively, for example, in place of the table itself, the control processing 211 of all vehicles have a function of inducing the correspondence relationship shown in FIG. 9 in advance, calculates the channel corresponding to the location of the own vehicle in the platoon, and sets the transmission timing to the frontward transmission processing 214 and the backward transmission processing 216. Alternatively, transmission timing may be notified by wireless communication to the control processing 211 of the respective vehicles based on the table shown in FIG. 9 which the control processing 211 of any vehicle such as, for example, the head vehicle has, and the control processing 211 of each of the vehicles may set the transmission timing to the frontward transmission processing 214 and the backward transmission processing 216. The wireless communication used in the notification of transmission timing between the vehicles may not follow the transmission timing shown in FIG. 9. Further, the transmission timing of each vehicle may not follow the transmission timing shown in FIG. 9 until notification of the transmission timing between the vehicles is not finished.

For example, in a case where the vehicle leaves from the platoon or in a case where the vehicle joins the platoon, the transmission timings between all vehicles may be reset and decided again. Alternatively, only the channels behind a location where a change of the platoon occurs may be changed without changing the transmission timing within a range where the frontward transmission and the backward transmission are not influenced by leaving or joining of the vehicle. In this case, processing other than communication relating to the notification of the transmission timing may be stopped during a period until a change of the transmission timing is completed, or until the change of the transmission timing is completed, communication may be performed using the transmission timing before such a change.

As has been described above, according to the embodiment of the present invention, in the wireless communication system which performs communication between the wireless communication apparatuses mounted on the vehicles which perform platooning, a frequency channel used in data transmission and reception between the own vehicle and the preceding vehicle adjacent to the own vehicle and a frequency channel used in data transmission and reception between the own vehicle and the succeeding vehicle adjacent to the own vehicle are different from each other. Accordingly, it is possible to perform wireless communication which exhibits low possibility of occurrence of a delay and high reliability.

In establishing wireless communication between the vehicles, the first communication is established between the first vehicle at the head or at the tail and the second vehicle adjacent to the first vehicle using the first frequency channel, and after the first communication is established, the communication is established between the second vehicle and the third vehicle adjacent to the second vehicle using the second frequency channel. Accordingly, it is possible to allocate the channels by eliminating the overlapping of the channels with certainty.

The wireless communication apparatus holds a list which includes information on a plurality of frequency channel candidates used in the data transmission and reception, and information on the frequency channels which are already selected, and selects the frequency channels by looking up the list. Accordingly, it is possible to allocate the channels by eliminating the overlapping of the channels with certainty.

Data transmission and reception timings are controlled so as to prevent the timing at which data is transmitted or received between the own vehicle and the preceding vehicle adjacent to the own vehicle and the timing at which data is transmitted or received between the own vehicle and the succeeding vehicle adjacent to the own vehicle from overlapping with each other. Accordingly, a failure of communication caused by interference from the neighboring channel can be suppressed.

The wireless communication apparatus notifies other wireless communication apparatuses of information on the data transmission and reception timing control and hence, timings which do not overlap with each other can be decided with certainty.

The frequency channel is arranged adjacent to another frequency channel to an extent that a part of electricity of a wireless signal is leaked to another frequency channel and interferes with data transmission and reception. Accordingly, a failure in communication caused by interference from the neighboring channel can be suppressed.

In adding duplicated reception data to a transmission queue area (for example, a queue) for transmitting the data to other vehicles, when the same data exists in the transmission queue area, one of these data is erased. That is, data is transmitted by duplication and hence, data can be transmitted within a short time with high reliability. Further, the same data is erased and hence, an excessive increase of an amount of data can be controlled.

Data to be transmitted and received includes: a first area in which an identifier indicating a type of information is stored; and a second area in which the number indicating a time sequence of the data (for example, a sequence number or a time stamp) is stored. When data having the same identifier as the first area is already stored in the transmission queue area at the time of adding duplicated reception data in a transmission queue area for transmitting reception data to other vehicles, one data is erased based on a result of comparison between the data in the first area and the data in the second area and hence, truly necessary data can be transferred with certainty.

The present invention is not limited to the above-mentioned embodiment, and includes various modifications and substantially equal configurations within the gist of appended claims. For example, the above-mentioned embodiment is described in detail for facilitating the understanding of the present invention, and the present invention is not necessarily limited to the configuration which includes all constitutional elements described in the embodiment. Further, a part of the configurations of one embodiment can be replaced with the configuration of another embodiment. The configuration of one embodiment can be added to the configuration of another embodiment. With respect to parts of configurations of the respective embodiments, the addition, the deletion or the replacement of other configurations can be made.

The respective configurations, functions, processing units, processing means and the like described above may be realized by hardware partially or wholly such as by designing them using an integrated circuit, for example. Alternatively, the respective configurations, functions, processing units, processing means and the like may be realized by software which interprets and executes programs which allow the processors to realize the respective functions. When a plurality of functions which are same in configuration exist, hardware or a software which realizes the respective functions may be separately mounted, or a plurality of processing may be carried out by using one implemented hardware or by using one implemented software in a time-multiplexing manner. Further, even when the respective configurations, functions, processing units, processing means and the like may have a single function in configuration, distributed processing may be carried out using a plurality of hardware or a plurality of software having the same functions.

Information such as programs, tables, files and the like which realize the respective functions can be stored in a storage device such as a memory, a hard disc, a solid state drive (SSD) or a storage medium such as an IC card, an SD card or a DVD.

Further, control lines and information lines which are considered necessary to describe the present invention are illustrated, and the embodiment it should not be construed that all control lines and all information lines necessary for mounting configurational parts are described. In an actual configuration, It should be construed that substantially all configurational parts are mutually connected with each other in the actual system and the actual apparatus.

The invention claimed is:

1. A wireless communication system capable of performing communication between wireless communication apparatuses mounted on vehicles performing platooning, wherein
a frequency channel used in data transmission and reception between an own vehicle and a preceding vehicle adjacent to the own vehicle, and a frequency channel used in data transmission and reception between the own vehicle and a succeeding vehicle adjacent to the own vehicle are different from each other.

2. The wireless communication system according to claim 1, wherein
in establishing wireless communication between the vehicles, a first communication is established between a first vehicle at a head or at a tail and a second vehicle adjacent to the first vehicle using a first frequency channel, and after the first communication is established, communication is established between the second vehicle and a third vehicle adjacent to the second vehicle using a second frequency channel.

3. The wireless communication system according to claim 2, wherein
each of the wireless communication apparatuses holds a list which includes information on a plurality of frequency channel candidates used in data transmission and reception, and information on the frequency channels which are already selected, and selects the frequency channels by looking up the list.

4. The wireless communication system according to claim 1, wherein
data transmission and reception timings are controlled so as to prevent timing at which data is transmitted or received between the own vehicle and the preceding vehicle adjacent to the own vehicle and timing at which data is transmitted or received between the own vehicle and the succeeding vehicle adjacent to the own vehicle from overlapping with each other.

5. The wireless communication system according to claim 4, wherein
each of the wireless communication apparatus notifies other wireless communication apparatuses of information on data transmission and reception timing.

6. The wireless communication system according to claim 4, wherein
the frequency channel is disposed adjacent to another frequency channel to an extent that a part of electricity of a wireless signal is leaked to the another frequency channel and interferes with data transmission and reception.

7. The wireless communication system according to claim 1, wherein
at the time of adding duplicated reception data to a transmission queue area for transmitting reception data to other vehicles, when same data exists in the transmission queue area, addition of one of the data is suppressed.

8. The wireless communication system according to claim 7, wherein
data to be transmitted and received includes: a first area in which an identifier indicating a type of information is stored; and a second area in which a number indicating a time sequence of the data is stored, and when the identifier in the first area indicates that same data is already stored in the transmission queue area at the time of adding duplicated reception data to a transmission queue area for transmitting reception data to other vehicles, addition of one data is suppressed based on a result of a comparison between the data in the first area and the data in the second area.

9. A wireless communication apparatus mounted on a vehicle performing platooning, wherein a frequency channel used in data transmission and reception between an own vehicle and a preceding vehicle adjacent to the own vehicle, and a frequency channel used in data transmission and reception between the own vehicle and a succeeding vehicle adjacent to the own vehicle are different from each other.

10. The wireless communication apparatus according to claim 9, wherein in establishing wireless communication between the vehicles, a first communication is established between a first vehicle at a head or at a tail and a second vehicle adjacent to the first vehicle using a first frequency channel, and after the first communication is established, communication is established between the second vehicle and a third vehicle adjacent to the second vehicle using a second frequency channel.

11. The wireless communication apparatus according to claim 10, wherein the wireless communication apparatus holds a list which includes information on a plurality of frequency channel candidates used in data transmission and reception, and information on the frequency channels which are already selected, and selects the frequency channels by looking up the list.

12. The wireless communication apparatus according to claim 9, wherein data transmission and reception timing is controlled so as to prevent timing at which data is transmitted or received between the own vehicle and the preceding vehicle adjacent to the own vehicle and timing at which data is transmitted or received between the own vehicle and the succeeding vehicle adjacent to the own vehicle from overlapping with each other.

13. The wireless communication apparatus according to claim 12, wherein the frequency channel is arranged adjacent to another frequency channel to an extent that a part of electricity of a wireless signal is leaked to the another frequency channel and interferes with the data transmission and reception.

14. The wireless communication apparatus according to claim 9, wherein when the identifier indicates that same data exists in the transmission queue area at the time of adding duplicated reception data to a transmission queue area for transmitting reception data to other vehicles, addition of one data is suppressed.

15. The wireless communication apparatus according to claim 14, wherein data to be transmitted and received includes: a first area in which an identifier indicating a type of information is stored; and a second area in which a number indicating a time sequence of the data is stored, and when the identifier indicates that same data is already stored in the transmission queue area at the time of adding duplicated reception data to a transmission queue area for transmitting reception data to other vehicles plural times, addition of one data is suppressed based on a result of a comparison between the data in the first area and the data in the second area.

\* \* \* \* \*